US009863360B2

(12) United States Patent
McQuillen et al.

(10) Patent No.: US 9,863,360 B2
(45) Date of Patent: Jan. 9, 2018

(54) SYSTEMS AND METHODS FOR ADJUSTING FUEL INJECTION BASED ON A DETERMINED FUEL RAIL TEMPERATURE

(71) Applicant: Ford Global Technologies, LLC, Dearborn, MI (US)

(72) Inventors: Michael McQuillen, Warren, MI (US); Gopichandra Surnilla, West Bloomfield, MI (US); Mohan Karulkar, Dearborn, MI (US); Brian Joseph Robert, Saint Clair Shores, MI (US); Richard E. Soltis, Saline, MI (US); Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/179,794

(22) Filed: Jun. 10, 2016

(65) Prior Publication Data
US 2017/0356382 A1    Dec. 14, 2017

(51) Int. Cl.
*F02D 41/40* (2006.01)
*F02D 41/38* (2006.01)
*F02M 63/02* (2006.01)

(52) U.S. Cl.
CPC ....... *F02D 41/401* (2013.01); *F02D 41/3845* (2013.01); *F02M 63/029* (2013.01); *F02M 63/0225* (2013.01); *F02M 63/0265* (2013.01); *F02D 2041/3881* (2013.01)

(58) Field of Classification Search
CPC ............. F02D 41/3809; F02D 41/401; F02M 63/0225; F02M 55/025

USPC .......................... 701/104; 123/456, 447, 494
See application file for complete search history.

(56) References Cited

U.S. PATENT DOCUMENTS

| | | | |
|---|---|---|---|
| 4,004,948 A | 1/1977 | Smith | |
| 4,276,411 A | 6/1981 | DiGiacomo et al. | |
| 5,168,856 A * | 12/1992 | Lorraine | F02M 69/465 |
| | | | 123/456 |
| 5,513,613 A * | 5/1996 | Taylor | F02M 51/005 |
| | | | 123/456 |
| 5,542,395 A | 8/1996 | Tuckey et al. | |
| 5,865,158 A * | 2/1999 | Cleveland | F02D 41/3005 |
| | | | 123/478 |
| 7,731,867 B2 | 6/2010 | Li et al. | |

(Continued)

FOREIGN PATENT DOCUMENTS

DE    102007053408 A1    5/2009

OTHER PUBLICATIONS

Robert, Brian Joseph et al., "Battery Cell with Temperature Sensor," U.S. Appl. No. 14/831,333, filed Aug. 20, 2015, 20 pages.

*Primary Examiner* — Mahmoud Gimie
(74) *Attorney, Agent, or Firm* — Julia Voutyras; McCoy Russell LLP

(57) ABSTRACT

Methods and systems are provided for detecting a temperature of an engine fuel rail at a plurality of locations along the engine fuel rail. In one example, a method may include detecting temperatures along the engine fuel rail with a plurality of metal film thermocouples adhered to the engine fuel rail and arranged proximate to engine fuel injectors, and adjusting fuel injector operation and/or fuel rail pressure in response to the detected fuel rail temperatures.

19 Claims, 5 Drawing Sheets

(56) References Cited

U.S. PATENT DOCUMENTS

| | | |
|---|---|---|
| 8,023,269 B2 | 9/2011 | Mitchell et al. |
| 8,828,570 B2 | 9/2014 | Banerjee et al. |
| 2005/0257822 A1 | 11/2005 | Smith et al. |
| 2011/0277803 A1 | 11/2011 | Grande et al. |
| 2013/0344355 A1 | 12/2013 | Kozinsky et al. |
| 2014/0269811 A1 | 9/2014 | Maleki et al. |
| 2015/0037635 A1 | 2/2015 | Reihlen et al. |

* cited by examiner

SYSTEMS AND METHODS FOR ADJUSTING FUEL INJECTION BASED ON A DETERMINED FUEL RAIL TEMPERATURE

FIELD

The present description relates generally to methods and systems for determining and controlling fuel rail conditions in a vehicle engine.

BACKGROUND/SUMMARY

An internal combustion engine may include a fuel injection system configured to inject fuel directly into one or more engine cylinders via a fuel injector coupled to each cylinder. Injecting fuel directly into each cylinder (as opposed to injecting fuel into an intake air path upstream of each cylinder) may increase an efficiency of combustion of an air/fuel mixture within each cylinder due to an increased control over the amount of fuel injected. Fuel pressure is often increased by a high-pressure pump coupled to one or more fuel rails prior to injection of the fuel into one or more cylinders. Each fuel rail is coupled to one or more of the fuel injectors in order to flow pressurized fuel from the high-pressure pump towards the fuel injectors. As engine load increases, a temperature of each fuel rail may increase due to proximity of each fuel rail to the engine and its components. If fuel rail temperature is not measured and/or controlled, a temperature of fuel within each fuel rail may increase until the fuel reaches a temperature of vaporization. Injection of vaporized fuel into engine cylinders may result in degradation of the cylinders and/or fuel system components. As a result, engine performance may decrease. Additionally, if the temperature of fuel within each fuel rail is different at one or more fuel injectors, a density of the fuel at the one or more fuel injectors may be different and too much or too little fuel may be injected.

Attempts to address the issues described above by determining fuel rail temperature include inferring the fuel rail temperature based on an output of one or more devices coupled to an inlet of a fuel rail. One example approach is shown by Jung et al. in DE 102007053408. Therein, temperature of fuel within a fuel rail is inferred by measuring an electrical resistance of a coil coupled to a fuel pressure valve and/or a fuel flow valve.

However, the inventors herein have recognized potential issues with such systems. As one example, inferring temperature of fuel within a fuel rail based on conditions at a fuel pressure valve or fuel flow valve does not provide information about a temperature of the fuel at specific locations along the fuel rail (for example, at one or more fuel injectors). Additionally, due to the proximity of each fuel rail to the fuel injectors (and therefore, the engine cylinders), a space may not be available to accommodate temperature sensing devices arranged near the fuel injectors (for example, sensing devices such as the coil described above).

In one example, the issues described above may be addressed by a fuel injection system, comprising: at least one fuel rail; a plurality of fuel injectors coupled to the at least one fuel rail; and a plurality of metal film thermocouples directly bonded to the at least one fuel rail. In this way, temperatures of the fuel rail at a plurality of locations are measured directly at one or more surfaces of the fuel rail, and fuel rail conditions and/or fuel injector nozzle opening times may be adjusted in response to the measured temperatures.

As one example, a pressure of fuel within the fuel rail may be increased in response to one or more of the measured temperatures exceeding a threshold temperature. By adjusting the pressure of the fuel within the fuel rail in response to the measured temperatures, a likelihood of fuel vaporization within the fuel rail may be decreased. Additionally, by adjusting fuel injector nozzle opening times in response to the measured temperatures, a controlled amount of fuel may be delivered to each cylinder in situations where a density of the fuel is different at one or more locations along the fuel rail (due to a difference in fuel temperature at the one or more locations). By controlling the fuel pressure and fuel injector nozzle opening times in this way, fuel may be injected into each cylinder with increased precision, and engine performance may be increased (e.g., via reduced emissions and increased engine torque output).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-4 are shown approximately to scale, although other relative dimensions may be used.

DETAILED DESCRIPTION

Figure 1:
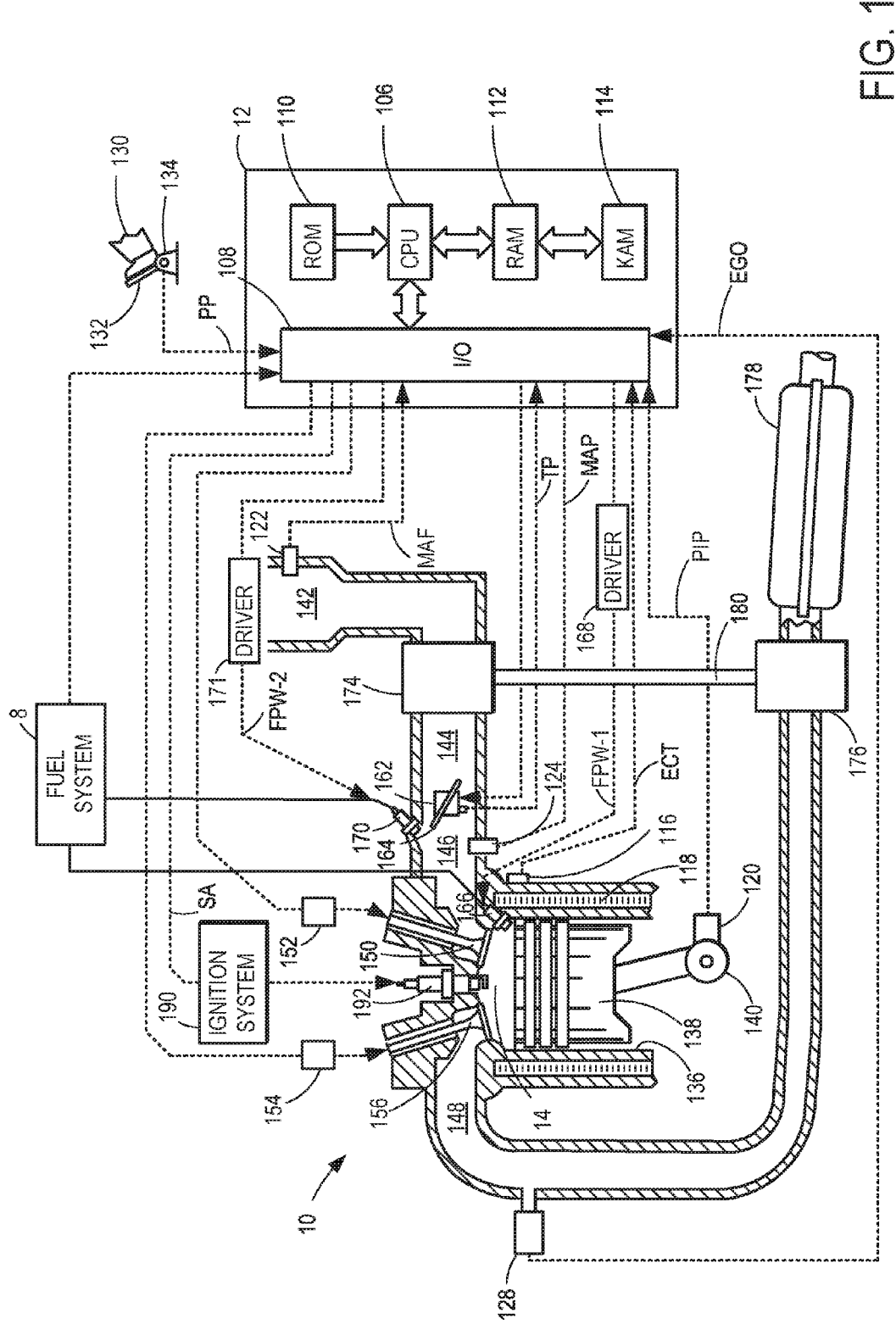
FIG. 1 schematically depicts a cylinder of an internal combustion engine configured to receive fuel from a fuel injection system.
Figure 2:
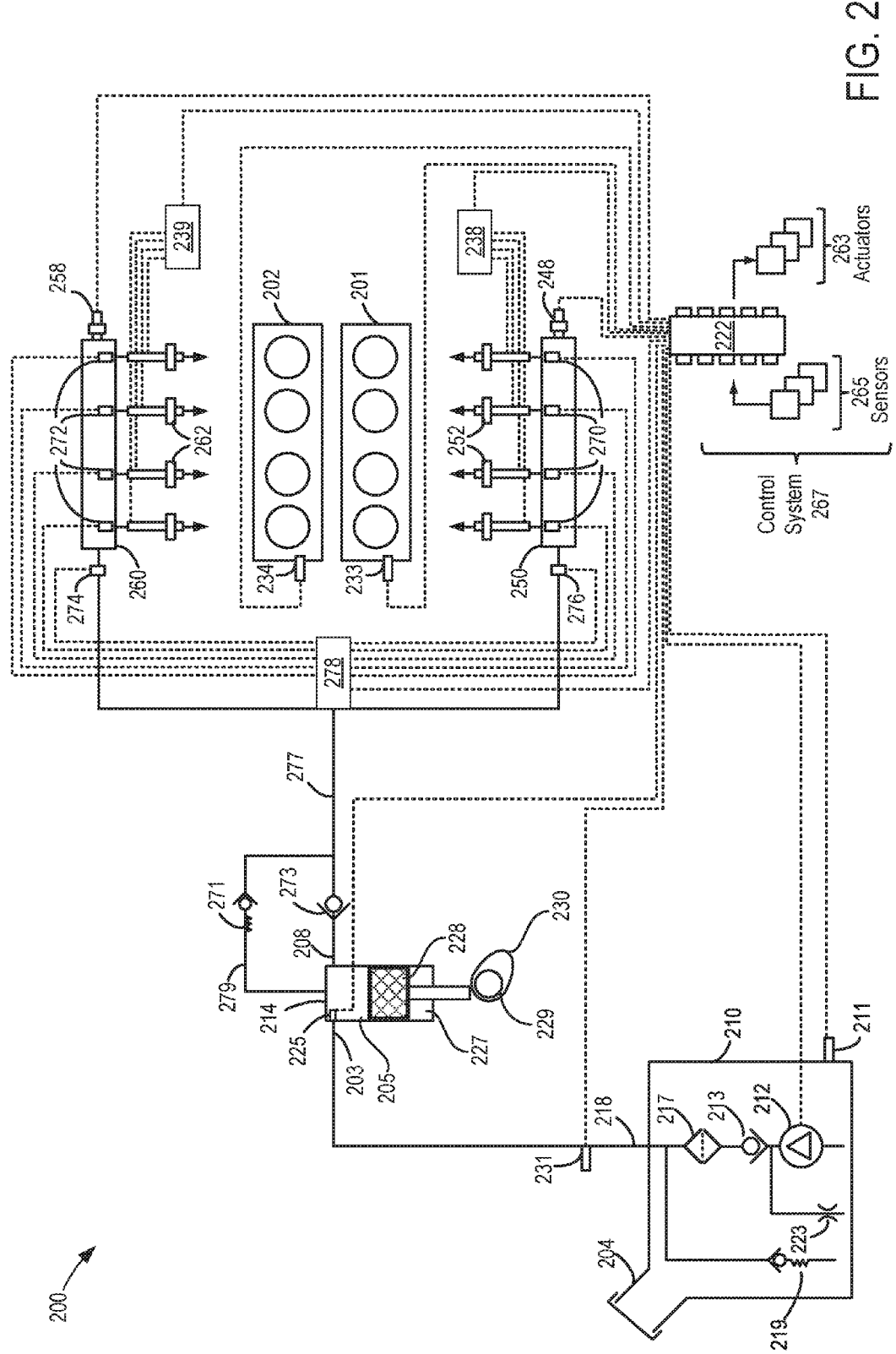
FIG. 2 schematically depicts an engine fuel injection system including a plurality of metal film thermocouples coupled to a fuel rail.
Figure 3:
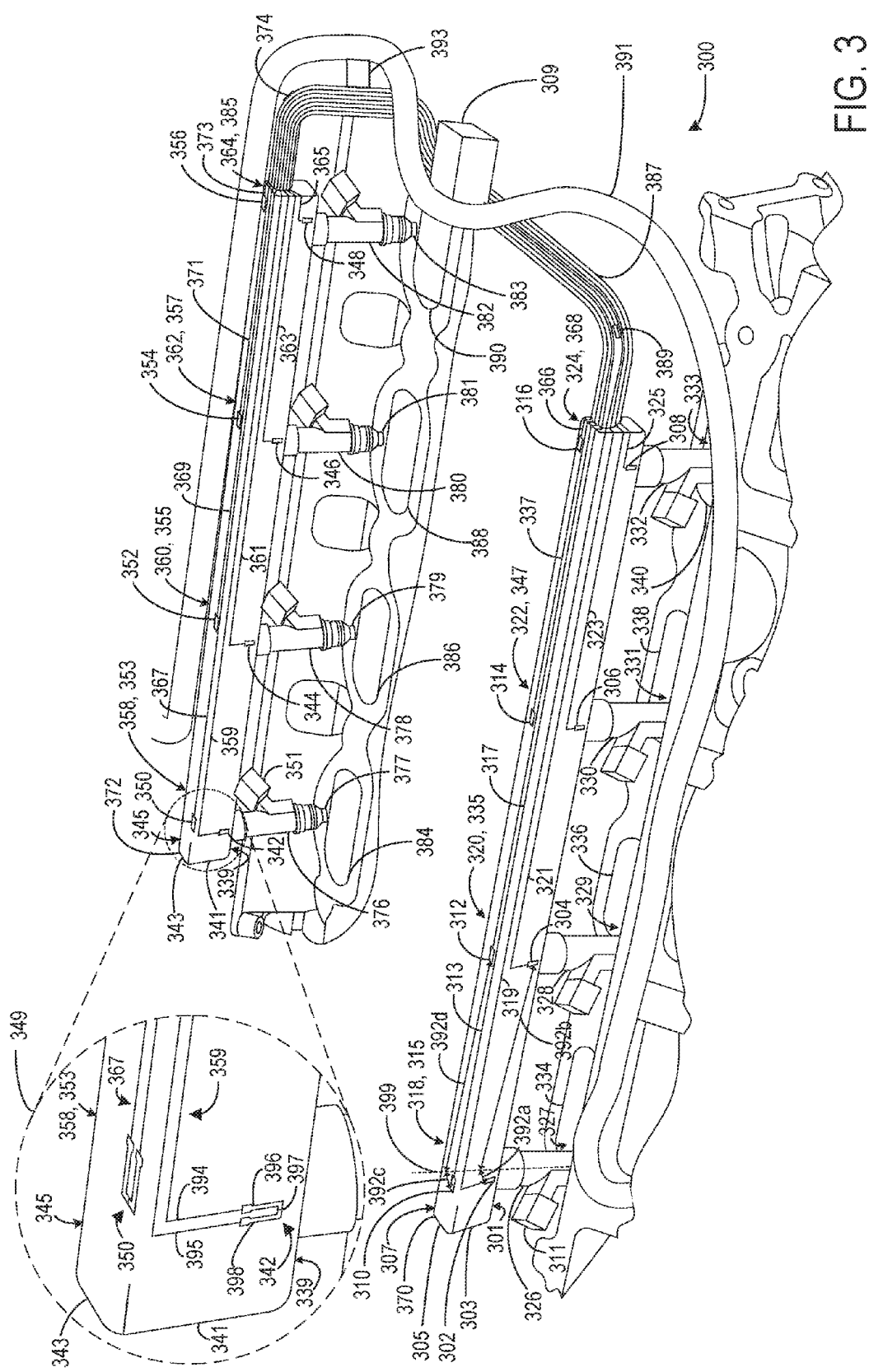
FIG. 3 shows a first perspective view of an embodiment of an engine fuel injection system including a plurality fuel injectors and a plurality of metal film thermocouples coupled to two fuel rails.
Figure 4:
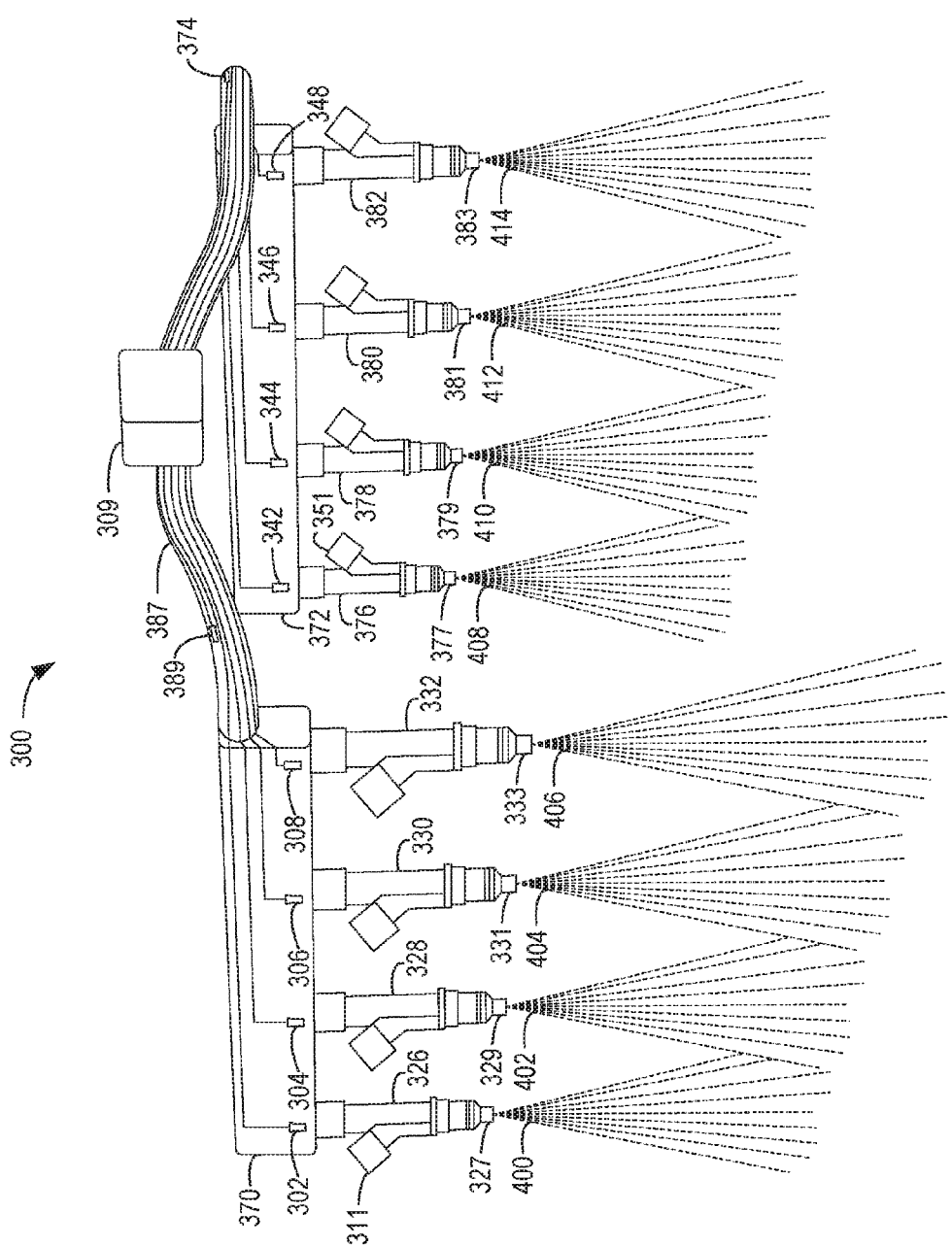
FIG. 4 shows a second perspective view of the embodiment of the engine fuel injection system with the engine fuel injection system separated from additional components of an engine.
Figure 5:
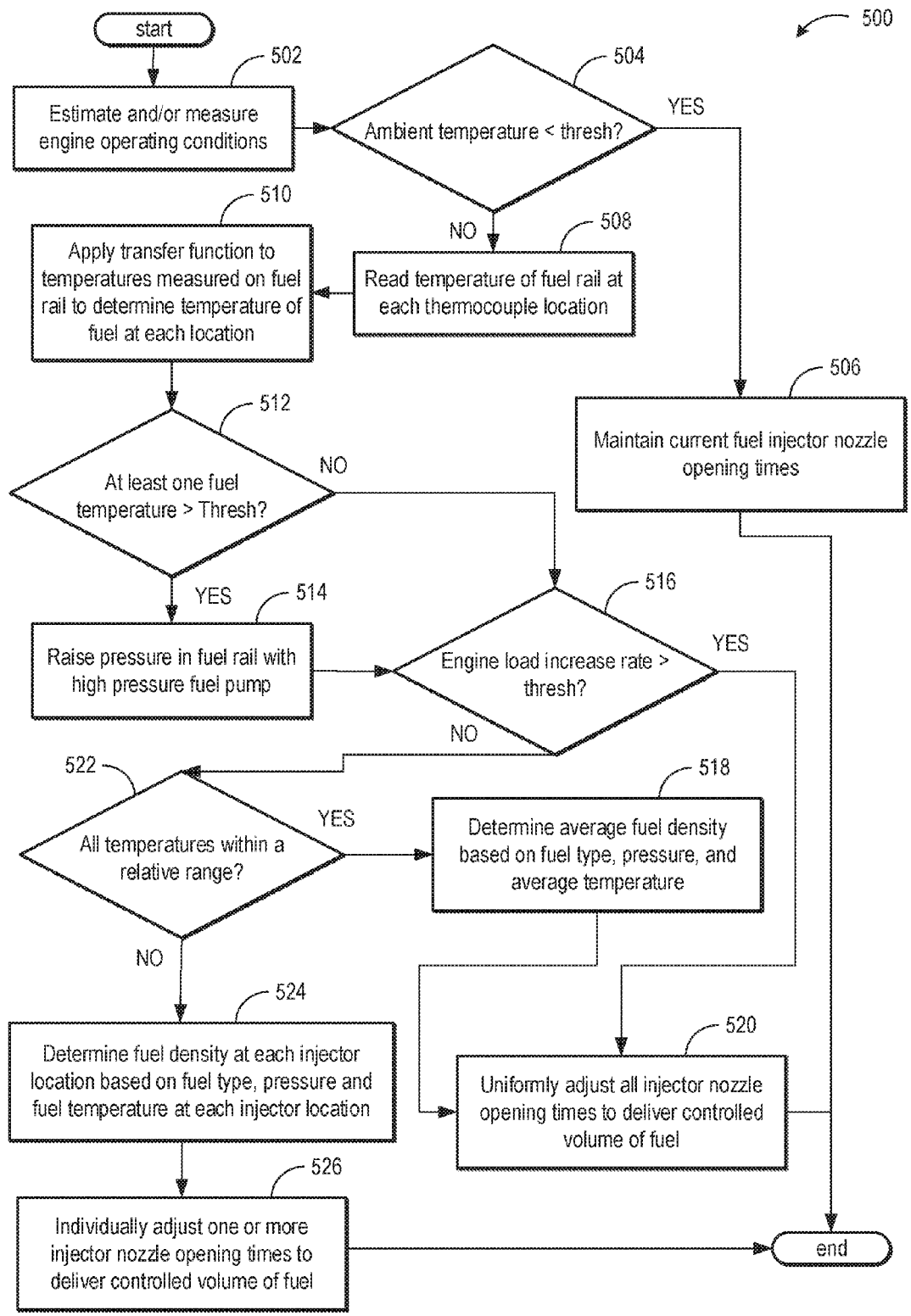
FIG. 5 illustrates an example method for determining a temperature of fuel within a fuel rail of an engine fuel injection system and adjusting engine operating conditions in response to the determined temperature.

The following description relates to systems and methods for a fuel injection system coupled to at least one cylinder of an internal combustion engine, such as the cylinder shown by FIG. 1. The fuel injection system, such as the fuel injection system shown by FIG. 2, is configured to inject fuel directly into one or more cylinders of an engine via a plurality of fuel injectors coupled to one or more fuel rails. The fuel injection system includes a plurality of thermocouples coupled to each fuel rail. In one example, the thermocouples are metal film thermocouples. The plurality of metal film thermocouples are electrically coupled to a single control unit via a plurality of metal film connectors, as shown by FIG. 3. The control unit may be electrically coupled to and/or in electronic communication with a controller of the engine (as shown by FIG. 2) and may transmit signals (e.g., temperature readings) from the plurality of metal film thermocouples to the controller. The controller may adjust opening times of one or more fuel injector nozzles in response to the temperature readings in order to adjust fuel flows from the fuel injectors (such as the fuel flows shown by FIG. 4). An example control routine of the controller is shown by FIG. 5, wherein the controller may adjust fuel nozzle opening times and may additionally adjust an output of a high-pressure fuel pump in response to signals from the plurality of metal film thermocouples. In this way, temperatures measured by the plurality of metal film thermocouples at a plurality of locations along each fuel rail are interpreted by the control unit and transmitted to the controller to adjust a fuel pressure within each fuel rail and decrease a risk of fuel vaporization. Additionally, the measured temperatures may be used by the control unit to determine a fuel density at one or more of the fuel injectors. The controller may then adjust fuel injector nozzle opening times in response to the determined fuel densities. The adjustments to fuel pressure and fuel injector nozzle opening times may increase engine performance (via delivering desired fuel injection amounts) and reduce a risk of degradation of fuel injection system components.

FIG. 1 depicts an example of a cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (which may also herein be referred to as a combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 (not shown) in addition to cylinder 14. In some examples, one or more of the intake passages may include a boosting device such as a turbocharger or a supercharger. For example, FIG. 1 shows engine 10 configured with a turbocharger including a compressor 174 arranged between intake air passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake poppet valve 150 may be controlled by controller 12 via actuator 152. Similarly, exhaust poppet valve 156 may be controlled by controller 12 via actuator 154. During some conditions, controller 12 may vary the signals provided to actuators 152 and 154 to control the opening and closing of the respective intake and exhaust valves. The position of intake poppet valve 150 and exhaust poppet valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Each cylinder of engine 10 is configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIGS. 2-4, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168.

In this manner, fuel injector 166 provides what is known as direct injection (hereafter referred to as "DI") of fuel into combustion cylinder 14. While FIG. 1 shows fuel injector 166 positioned to one side of cylinder 14, it may alternatively be located overhead of the piston, such as near the position of spark plug 192 (and as shown by FIGS. 3-4). Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail (as shown by FIG. 2). Further, the fuel tank may have a pressure transducer (e.g., pressure sensor, such as the pressure sensor shown by FIG. 2) providing a signal to controller 12.

Fuel injector 170 is shown arranged in intake air passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single electronic driver 168 or 171 may be used for both fuel injection systems, or multiple drivers, for example electronic driver 168 for fuel injector 166 and electronic driver 171 for fuel injector 170, may be used, as depicted.

In an alternate example, each of fuel injectors 166 and 170 may be configured as direct fuel injectors for injecting fuel directly into cylinder 14. In yet other examples, cylinder 14 may include a single fuel injector that is configured to receive different fuels from the fuel systems in varying relative amounts as a fuel mixture, and is further configured to inject this fuel mixture directly into the cylinder as a direct fuel injector. As such, the fuel systems described herein are not limited to the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among fuel injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature. The controller 12 receives signals from the various sensors of FIG. 1 and employs the various actuators of FIG. 1 to adjust engine operation based on the received signals and instructions stored on a memory of the controller. For example, adjusting fuel injection may include adjusting an actuator of the fuel injector 166 (such as electronic driver 168, as described above) to adjust an amount of fuel injected into the cylinder.

As described above, FIG. 1 shows one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

FIG. 2 schematically depicts an example embodiment of a fuel injection system 200 (which may herein be referred to as fuel system 200) similar to fuel system 8 shown by FIG. 1. Fuel system 200 may be operated to deliver fuel to an engine, such as engine 10 of FIG. 1. Fuel system 200 may be operated by a controller to perform some or all of the operations described below with reference to the method shown by FIG. 5.

Fuel system 200 includes a fuel storage tank 210 for storing fuel on-board a vehicle including the engine, a lower pressure fuel pump (LPP) 212 (herein also referred to as fuel lift pump 212), and a higher pressure fuel pump (HPP) 214 (herein also referred to as fuel injection pump 214). Fuel may be provided to fuel storage tank 210 via fuel filling passage 204. The fuel storage tank 210 may include a pressure sensor 211 for sensing a pressure of fuel stored within the fuel storage tank 210.

In one example, LPP 212 may be an electrically-powered lower pressure fuel pump disposed at least partially within fuel storage tank 210. LPP 212 may be operated by a controller 222 (e.g., similar to controller 12 of FIG. 1) to provide fuel to HPP 214 via low-pressure (LP) fuel passage 218. As one example, LPP 212 may be a turbine (e.g., centrifugal) pump including an electric (e.g., DC) pump motor, whereby a pressure increase across the pump and/or the volumetric flow rate through the pump may be controlled by varying an electrical power provided to the pump motor, thereby increasing or decreasing a speed of the pump motor. For example, as the controller reduces the electrical power that is provided to fuel lift pump 212, the volumetric flow rate and/or pressure increase across the lift pump may be reduced. The volumetric flow rate and/or pressure increase across the pump may be increased by increasing the electrical power that is provided to fuel lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the fuel injection pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. A pressure relief valve 219 may be employed to reduce the fuel pressure in LP fuel passage 218 (e.g., the output from fuel lift pump 212). Relief valve 219 may include a ball and spring mechanism that seats and seals at a specified pressure differential, for example. The pressure differential set-point at which relief valve 219 may be configured to open may assume various suitable values; as a non-limiting example the set-point may be 6.4 bar or 5 bar (g). An orifice 223 may be utilized to allow for air and/or fuel vapor to bleed out of the fuel lift pump 212. This bleed at orifice 223 may also be used to power a jet pump (not shown) used to transfer fuel from one location to another within the fuel storage tank 210. In one example, an orifice check valve (not shown) may be placed in series with orifice 223. In some embodiments, fuel injection system 200 may include one or more (e.g., a series) of check valves fluidly coupled to fuel lift pump 212 to impede fuel from leaking back upstream of the valves. In this context, upstream flow refers to fuel flow traveling from a first fuel rail 250 and a second fuel rail 260 towards LPP 212 while downstream flow refers to the nominal fuel flow direction from the LPP towards the HPP 214 and thereon to the fuel rails.

Fuel lifted by LPP 212 may be supplied at a lower pressure into the LP fuel passage 218 coupled to an inlet 203 of HPP 214. HPP 214 may then deliver fuel into the first fuel rail 250 coupled to one or more fuel injectors of a first group of direct injectors 252 (herein also referred to as a first injector group). Fuel lifted by the LPP 212 may also be supplied to the second fuel rail 260 coupled to one or more fuel injectors of a second group of direct injectors 262 (herein also referred to as a second injector group). HPP 214 may be operated to raise a pressure of fuel delivered to the first fuel rail 250 and second fuel rail 260 to a pressure greater than a first pressure generated by LPP 212. As a result, high pressure direct injection may be enabled while port fuel injection (not shown by FIGS. 2-4) may be supplied at a lower pressure.

While the first fuel rail 250 is shown dispensing fuel to four fuel injectors of the first injector group 252 and the second fuel rail 260 is shown dispensing fuel to four fuel injectors of the second injector group 262, each fuel rail may dispense fuel to any suitable number of fuel injectors of their corresponding fuel injector groups. As one example, first fuel rail 250 may dispense fuel to one fuel injector of first injector group 252 for each cylinder of a first cylinder bank 201 of the engine while second fuel rail 260 may dispense fuel to one fuel injector of second injector group 262 for each cylinder of a second cylinder bank 202 of the engine. Controller 222 can individually actuate each of the fuel injectors of the first injector group 252 coupled to the first fuel rail 250 via a first direct injection driver 238, and can actuate each of the fuel injectors of the second injector group 262 coupled to the second fuel rail 260 via a second direct injection driver 239. The controller 222, the first direct injection driver 238, the second direct injection driver 239, and other suitable engine system components (e.g., sensors 265 and actuators 263, such as the sensors and actuators described above in the discussion of FIG. 1) may comprise a control system 267. While the first direct injection driver 238 and second direct injection driver 239 are shown external to the controller 222, in other examples, the controller 222 can include the first direct injection driver 238 and second direct injection driver 239 or can be configured to provide the functionality of the first direct injection driver 238 and second direct injection driver 239. Controller 222 may include additional components not shown, such as those included in controller 12 of FIG. 1.

HPP 214 may be an engine-driven, positive-displacement pump. As one non-limiting example, HPP 214 may utilize a solenoid activated control valve 225 (e.g., fuel volume regulator, magnetic solenoid valve, etc.) to vary an effective pump volume of each pump stroke. In one example, actuation of the solenoid activated control valve 225 may be controlled by the controller 222. The outlet check valve 273 of HPP 214 is mechanically controlled and not electronically controlled by an external controller. HPP 214 may be mechanically driven by the engine in contrast to the electrically driven LPP 212. HPP 214 includes a pump piston 228, a pump compression chamber 205 (herein also referred to as compression chamber), and a step-room 227. Pump piston 228 receives a mechanical input from an engine cam shaft 229 via cam 230, thereby operating the HPP 214 according to the principle of a cam-driven single-cylinder pump. A sensor (not shown in FIG. 2) may be positioned near cam 230 to enable determination of the angular position of the cam (e.g., between 0 and 360 degrees), which may be relayed to controller 222.

A lift pump fuel pressure sensor 231 may be positioned along LP fuel passage 218 between fuel lift pump 212 and fuel injection pump 214. In this configuration, readings from lift pump fuel pressure sensor 231 may be interpreted as indications of the fuel pressure of fuel lift pump 212 (e.g., the outlet fuel pressure of the lift pump) and/or of the inlet pressure of the higher pressure fuel pump. Readings from lift pump fuel pressure sensor 231 may be used to assess the operation of various components in fuel system 200, to determine whether sufficient fuel pressure is provided to fuel injection pump 214 so that the higher pressure fuel pump ingests liquid fuel and not fuel vapor, and/or to minimize an average electrical power supplied to fuel lift pump 212.

First fuel rail 250 includes a first fuel rail pressure sensor 248 for providing an indication of a pressure of fuel within the first fuel rail 250 to the controller 222. Likewise, second fuel rail 260 includes a second fuel rail pressure sensor 258 for providing an indication of a pressure of fuel within the second fuel rail 260 to the controller 222. A first engine speed sensor 233 coupled to the first cylinder bank 201 and a second engine speed sensor 234 coupled to the second cylinder bank 202 may provide an indication of engine speed to the controller 222.

First fuel rail 250 and second fuel rail 260 are fluidly coupled to an outlet 208 of HPP 214 by fuel passage 277 (which may herein be referred to as fuel line 277). Additionally, the fuel passage 277 fluidly couples the first fuel rail 250 to the second fuel rail 260. Check valve 273 and pressure relief valve (also known as pump relief valve) 271 may be positioned between the outlet 208 of the HPP 214 and the first fuel rail 250 and second fuel rail 260. The pump relief valve 271 may be coupled to a bypass passage 279 of the fuel passage 277. Check valve 273 opens to increase a flow of fuel from the outlet 208 of HPP 214 into a fuel rail (e.g., first fuel rail 250 and/or second fuel rail 260) when a pressure at the outlet 208 of HPP 214 (in one embodiment, a compression chamber outlet pressure) is higher than the fuel rail pressure (e.g., pressure in either of the first fuel rail 250 or second fuel rail 260). The pump relief valve 271 may decrease the pressure in fuel passage 277, downstream of HPP 214 and upstream of first fuel rail 250. Pump relief valve 271 allows fuel flow out of the first fuel rail 250 and/or the second fuel rail 260 toward the outlet 208 of HPP 214 when the fuel rail pressure in one of either fuel rail is greater than a threshold pressure. In one example, the threshold pressure may be based on a predetermined pressure to reduce degradation of the first fuel rail 250 and/or second fuel rail 260. Alternate embodiments of the engine fuel injection system 200 may include additional valves (e.g., flow control valves, pressure relief valves, etc.) and/or sensors (flow sensors, pressure sensors, etc.) not shown by FIG. 2.

In an example operation of the fuel injection system 200, fuel is pumped out of the fuel storage tank 210 via actuation of LPP 212 by the controller 222. For example, the controller 222 may increase an electrical current to LPP 212 to increase a pumping speed of LPP 212. The fuel flows through the LP fuel passage 218 towards HPP 214 and is pressurized by LPP 212 within the LP fuel passage 218 to a first pressure. HPP 214 receives a signal from controller 222 to pump fuel from the LP fuel passage 218 into the fuel line 277. For example, controller 222 may actuate the solenoid activated control valve 225 of HPP 214 in order to increase a pumping output flow rate of HPP 214. The HPP 214 pumps fuel from the inlet 203 to the outlet 208 and into the fuel line 277. The fuel line 277 is pressurized by HPP 214 to a second pressure, with the second pressure being greater than the first pressure (e.g., the fuel pressure in fuel line 277 is greater than the fuel pressure in LP fuel passage 218 due to actuation of HPP 214 by controller 222). One or more fuel injectors of the first injector group 252 and/or second injector group 262 may then be actuated by the drivers (e.g., first direct injection driver 238 and/or second direct injection driver 249, respectively) to deliver fuel to one or more cylinders of the first cylinder bank 201 and/or second cylinder bank 202. In one example, the first direct injection driver 238 and/or second direct injection driver 239 may receive a signal from controller 222 to increase an opening of a nozzle of one or more fuel injectors of the first injector group and/or the second injector group in order to increase an injection of fuel into one or more cylinders.

In this way, controller 222 can control the operation of each of LPP 212 and HPP 214 to adjust an amount, pressure, flow rate, etc., of a fuel delivered to the engine. As one example, controller 222 can vary a pressure setting, a pump stroke amount, a pump duty cycle command, and/or fuel flow rate of the fuel pumps to deliver fuel to different locations of the fuel system. A driver (not shown) electronically coupled to controller 222 may be used to send a control signal to the low pressure pump, as required, to adjust the output (e.g., speed, flow output, and/or pressure) of the low pressure pump.

It is noted here that the fuel injection pump 214 of FIG. 2 is presented as an illustrative example of one possible configuration for a high pressure pump. Components shown in FIG. 2 may be removed and/or changed while additional components not presently shown may be added to fuel injection pump 214 while still maintaining the ability to deliver high-pressure fuel to fuel rails of fuel injection system 200.

Coupled to the first fuel rail 250 is a first plurality of thermocouples 270. Each thermocouple of the first plurality of thermocouples 270 (which may herein be referred to as first thermocouple group 270) is arranged proximate to a fuel injector of the first injector group 252. A first line thermocouple 276 is coupled to the fuel line 277 at a location proximate to the first fuel rail 250.

Coupled to the second fuel rail 260 is a second plurality of thermocouples 272. Each thermocouple of the second plurality of thermocouples 272 (which may herein be referred to as second thermocouple group 272) is arranged proximate to a fuel injector of the second injector group 262. A second line thermocouple 274 is coupled to the fuel line 277 at a location proximate to the second fuel rail 260.

As described in greater detail below during the discussion of FIGS. 3-4, each thermocouple of the first thermocouple group 270 and each thermocouple of the second thermocouple group 272 may be comprised of a metal film directly bonded to a surface of a corresponding fuel rail (e.g., thermocouples of the first thermocouple group 270 may be directly bonded to one or more surfaces of the first fuel rail 250, and thermocouples of the second thermocouple group 272 may be directly bonded to one or more surfaces of the second fuel rail 260). The first line thermocouple 276 and second line thermocouple 274 may be directly bonded to one or more surfaces of the fuel line 277.

While the schematic shown by FIG. 2 shows four thermocouples included within the first thermocouple group 270 and four thermocouples included within the second thermocouple group 272, a different number of thermocouples may be included in each group.

Each thermocouple is electrically coupled to a control unit 278 and may transmit electrical signals to the control unit (as described below during the discussion of FIG. 3). The control unit 278 may then process the signals using instructions stored in non-transitory memory of the controller and may transmit the processed signals to the controller 222. In this way, signals from each of the thermocouples may converge at a single connection bank (e.g., the control unit 278) and then the compiled signals may be sent via a single connection (e.g., wire or single electrical signal) to the controller 222. In some embodiments the control unit 278 may be integrated within the controller 222, and the controller 222 may perform the functions of the control unit 278 using instructions stored in non-transitory memory of the controller 222. An example operation of a control unit (such as control unit 278) is discussed in further detail below with reference to FIGS. 3-5. Additionally, the relative arrangement of the thermocouples, electrical connections, and fuel injectors is discussed in further detail below with reference to FIGS. 3-4.

FIG. 3 shows a first perspective view of an embodiment of a fuel injection system 300 for an engine (such as the engine 10 shown by FIG. 1). The fuel injection system 300 includes a first fuel rail 370 (similar to first fuel rail 250 shown by FIG. 2), a second fuel rail 372 (similar to second fuel rail 260 shown by FIG. 2), and a first fuel line 387 (similar to fuel line 277 shown by FIG. 2) fluidly and directly coupling the first fuel rail 370 to the second fuel rail 372. The first fuel line 387 is fluidly and directly coupled to a second fuel line 391 by a fuel line junction 393 (e.g., a fuel passage coupling the first fuel line to the second fuel line). Pressurized fuel may flow into the second fuel line 391 via a pump (such as the HPP 214 shown by FIG. 2), flow through the fuel line junction 393, and flow into the first fuel line 387.

A first fuel injector 326, a second fuel injector 328, a third fuel injector 330, and a fourth fuel injector 332 are coupled to a first rail surface 301 of the first fuel rail 370. The first, second, third, and fourth fuel injectors may herein be referred to collectively as a first injector group (similar to the first injector group 252 shown by FIG. 2). Each fuel injector of the first injector group is configured to inject fuel from the first fuel rail 370 into an individual cylinder. For example, the first fuel injector 326 is configured to inject fuel into a first cylinder 334 via a first nozzle 327, the second fuel injector 328 is configured to inject fuel into a second cylinder 336 via a second nozzle 329, the third fuel injector 330 is configured to inject fuel into a third cylinder 338 via a third nozzle 331, and the fourth fuel injector 332 is configured to inject fuel into a fourth cylinder 340 via a fourth nozzle 333. The first, second, third, and fourth cylinders may herein be referred to collectively as a first cylinder bank (similar to the first cylinder bank 201 shown by FIG. 2). The first fuel rail 370 is arranged proximate and approximately parallel to the first cylinder bank.

A first plurality of metal film thermocouples (similar to the first plurality of thermocouples 270 shown by FIG. 2) is coupled to a plurality of surfaces of the first fuel rail 370, and each fuel injector of the first injector group is proximate to at least one thermocouple of the first plurality of metal film thermocouples. For example, the first plurality of metal film thermocouples includes a first thermocouple 302 directly coupled (e.g., directly bonded) to the first fuel rail 370 along a second rail surface 303 and proximate to the first fuel injector 326, a second thermocouple 310 directly coupled to the first fuel rail 370 along a third rail surface 305 and proximate to the first fuel injector 326, and a third thermocouple 318 directly coupled to the first fuel rail 370 along a fourth rail surface 307 and proximate to the first fuel injector 326.

Each fuel injector of the first injector group is similarly proximate to three corresponding thermocouples of the first plurality of metal film thermocouples. For example, the second fuel injector 328 is proximate to a fourth thermocouple 304, fifth thermocouple 312, and sixth thermocouple 320 (directly coupled to the second rail surface 303, third rail surface 305, and fourth rail surface 307, respectively), the third fuel injector 330 is proximate to a seventh thermocouple 306, eighth thermocouple 314, and ninth thermocouple 322 (directly coupled to the second rail surface 303, third rail surface 305, and fourth rail surface 307, respectively), and the fourth fuel injector 332 is proximate to a tenth thermocouple 308, eleventh thermocouple 316, and twelfth thermocouple 324 (directly coupled to the second rail surface 303, third rail surface 305, and fourth rail surface 307, respectively). By arranging the thermocouples in this way, a temperature of the first fuel rail 370 may be determined at a plurality of locations along the first fuel rail 370 (e.g., at a location of each thermocouple coupled to the first fuel rail 370, with the thermocouples arranged proximate to the fuel injectors, as described above).

A fifth fuel injector 376, a sixth fuel injector 378, a seventh fuel injector 380, and an eighth fuel injector 382 are coupled to a fifth rail surface 339 of the second fuel rail 372. The fifth, sixth, seventh, and eighth fuel injectors may herein be referred to collectively as a second injector group (similar to the second injector group 262 shown by FIG. 2). Each fuel injector of the second injector group is configured to inject fuel from the second fuel rail 372 into an individual cylinder. For example, the fifth fuel injector 376 is configured to inject fuel into a fifth cylinder 384 via a fifth nozzle 377, the sixth fuel injector 378 is configured to inject fuel into a sixth cylinder 386 via a sixth nozzle 379, the seventh fuel injector 380 is configured to inject fuel into a seventh cylinder 388 via a seventh nozzle 381, and the eighth fuel injector 382 is configured to inject fuel into an eighth cylinder 390 via an eighth nozzle 383. The fifth, sixth, seventh, and eighth cylinders may herein be referred to collectively as a second cylinder bank (similar to the second cylinder bank 202 shown by FIG. 2). The second fuel rail 372 is arranged proximate and approximately parallel to the second cylinder bank.

A second plurality of metal film thermocouples (similar to the second plurality of thermocouples 272 shown by FIG. 2) is coupled to a plurality of surfaces of the second fuel rail 372, and each fuel injector of the second injector group is proximate to at least one thermocouple of the second plurality of metal film thermocouples. For example, the second plurality of metal film thermocouples includes a thirteenth thermocouple 342 directly coupled (e.g., directly bonded) to the second fuel rail 372 along a sixth rail surface 341 and proximate to the fifth fuel injector 376, a fourteenth thermocouple 350 directly coupled to the second fuel rail 372 along a seventh rail surface 343 and proximate to the fifth fuel injector 376, and a fifteenth thermocouple 358 directly coupled to the second fuel rail 372 along a eighth rail surface 345 and proximate to the fifth fuel injector 376. Each fuel injector of the second injector group is similarly proximate to three corresponding thermocouples of the second plurality of metal film thermocouples. For example, the sixth fuel injector 378 is proximate to a sixteenth thermocouple 344, seventeenth thermocouple 352, and eighteenth thermocouple 360 (directly coupled to the sixth rail surface 341, seventh rail surface 343, and eighth rail surface 345, respectively), the seventh fuel injector 380 is proximate to a nineteenth thermocouple 346, twentieth thermocouple 354, and twenty-first thermocouple 362 (directly coupled to the sixth rail surface 341, seventh rail surface 343, and eighth rail surface 345, respectively), and the eighth fuel injector 382 is proximate to a twenty-second thermocouple 348, twenty-third thermocouple 356, and twenty-fourth thermocouple 364 (directly coupled to the sixth rail surface 341, seventh rail surface 343, and eighth rail surface 345, respectively). By arranging the thermocouples in this way, a temperature of the second fuel rail 372 may be determined at a plurality of locations along the second fuel rail 372 (e.g., at a location of each thermocouple coupled to the second fuel rail 372, with the thermocouples arranged proximate to the fuel injectors as described above).

As an example, the thermocouples described herein (and with reference to FIGS. 2-4) as being "proximate" to a certain fuel injector refers to these thermocouples being closer to the certain fuel injector than other fuel injectors on the same fuel rail. In this way, the thermocouples proximate to a certain fuel injector are adapted to measure a temperature of fuel entering that fuel injector. In one example, the first thermocouple 302, the fourth thermocouple 304, the seventh thermocouple 306, and the tenth thermocouple 308 are each directly coupled to the first fuel rail 370 along the second rail surface 303, but of these four thermocouples, only the first thermocouple 302 is proximate to the first fuel injector 326. In other words, the first thermocouple 302 is a first distance 392a from a central axis 399 of the first fuel injector 326 while the other three thermocouples are each at distances greater than the first distance 392a from the central axis 399 (e.g., the fourth thermocouple 304 is a second distance 392b from the central axis 399, and the second distance 392b is greater than the first distance 392a). In another example, the second thermocouple 310, the fifth thermocouple 312, the eighth thermocouple 314, and the eleventh thermocouple 316 are each directly coupled to the first fuel rail 370 along the third rail surface 305, but of these four thermocouples (e.g., second, fifth, eighth, and eleventh), only the second thermocouple 310 is proximate to the first fuel injector 326. In other words, the second thermocouple 310 is a third distance 392c from a central axis 399 of the first fuel injector 326 while the other three thermocouples (e.g., fifth, eighth, and eleventh) are each at distances greater than the third distance 392c from the central axis 399 (e.g., the fifth thermocouple 312 is a fourth distance 392d from the central axis 399, and the fourth distance 392d is greater than the third distance 392c).

In one example of the fuel rails described above (e.g., the first fuel rail 370 and the second fuel rail 372), the first rail surface 301 is approximately parallel to the third rail surface 305, and the second rail surface 303 is approximately parallel to the fourth rail surface 307. The first rail surface 301 and the third rail surface 305 are approximately perpendicular to both of the second rail surface 303 and the fourth rail surface 307. Similarly, the fifth rail surface 339 is approximately parallel to the seventh rail surface 343, and the sixth rail surface 341 is approximately parallel to the eighth rail surface 345. The fifth rail surface 339 and seventh rail surface 343 are approximately perpendicular to both of the sixth rail surface 341 and the eighth rail surface 345. Alternate embodiments of the fuel injection system may include a different number of fuel rails. Alternate embodiments may also include a different number and/or arrangement of fuel rail surfaces.

The first fuel line 387 fluidly couples the first fuel rail 370 and the second fuel rail 372. A first line thermocouple 389 and a second line thermocouple 374 (which may herein be referred to collectively as a third plurality of metal film thermocouples) are directly coupled (e.g., directly bonded) to the first fuel line 387. The first line thermocouple 389 is arranged proximate to the first fuel rail 370 (e.g., positioned along the first fuel line 387 at a location proximate to the fourth fuel injector 332) while the second line thermocouple 374 is arranged proximate to the second fuel rail 372 (e.g., positioned along the first fuel line 387 at a location proximate to the eighth fuel injector 382). By arranging the first line thermocouple 389 and the second line thermocouple 374 along the first fuel line 387, a temperature of the first fuel line 387 may be determined.

Each of the thermocouples of the first, second, and third pluralities of metal film thermocouples (e.g., the first through twelfth thermocouples coupled to the first fuel rail, the thirteenth through twenty-fourth thermocouples coupled to the second fuel rail, and the line thermocouples coupled to the first fuel line) are individually electrically coupled to a control unit 309 (e.g., similar to the control unit 278 shown by FIG. 2) via connections which are described in further detail below. The connections may be directly coupled to a plurality of surfaces of components of the fuel injection system 300 (e.g., the fuel rails, fuel lines, and/or control unit 309). In one example (shown by FIG. 3), a first plurality of connections extends along a length of at least one surface of the first fuel rail 370 while a second plurality of connections extends along a length of at least one surface of the second fuel rail 372.

For example, a first connection 319 may be directly coupled to the second rail surface 303 of the first fuel rail 370 and may extend along both of the first fuel rail 370 and the first fuel line 387 to electrically couple the first thermocouple 302 to the control unit 309. A second connection 313 may be directly coupled to the third rail surface 305 of the first fuel rail 370 and may extend along both of the first fuel rail 370 and the first fuel line 387 to electrically couple the second thermocouple 310 to the control unit 309. A third connection 315 (a position of which is indicated in FIG. 3) may be directly coupled to the fourth rail surface 307 of the first fuel rail 370 and may extend along both of the first fuel rail 370 and the first fuel line 387 to electrically couple the third thermocouple 318 to the control unit 309.

Similar to the arrangement described above, the fourth thermocouple 304, fifth thermocouple 312, and sixth thermocouple 320 are individually electrically coupled to the control unit 309 via fourth connection 321, fifth connection 317, and sixth connection 335 (respectively), with the fourth connection 321 extending along the second rail surface 303 and first fuel line 387, the fifth connection 317 extending along the third rail surface 305 and first fuel line 387, and the sixth connection 335 extending along the fourth rail surface 307 and first fuel line 387. The seventh thermocouple 306, eighth thermocouple 314, and ninth thermocouple 322 are individually electrically coupled to the control unit 309 via seventh connection 323, eighth connection 337, and ninth connection 347 (respectively), with the seventh connection 323 extending along the second rail surface 303 and first fuel line 387, the eighth connection 337 extending along the third rail surface 305 and first fuel line 387, and the ninth connection 347 extending along the fourth rail surface 307 and first fuel line 387. The tenth thermocouple 308, eleventh thermocouple 316, and twelfth thermocouple 324 are individually coupled to the control unit 309 via tenth connection 325, eleventh connection 366, and twelfth connection 368 (respectively), with the tenth connection 325 extending along the second rail surface 303 and first fuel line 387, the eleventh connection 366 extending along the third rail surface 305 and first fuel line 387, and the twelfth connection 368 extending along the fourth rail surface 307 and first fuel line 387.

The connections coupled to the thermocouples of the second fuel rail 372 (e.g., the second plurality of metal film thermocouples directly bonded to the second fuel rail 372) are in a similar arrangement to the arrangement described above. For example, a thirteenth connection 359 may be directly coupled to the sixth rail surface 341 of the second fuel rail 372 and may extend along the first fuel line 387 to electrically couple the thirteenth thermocouple 342 to the control unit 309. A fourteenth connection 367 may be directly coupled to the seventh rail surface 343 of the second fuel rail 372 and may extend along the first fuel line 387 to electrically couple the fourteenth thermocouple 350 to the control unit 309. A fifteenth connection 353 (a position of which is indicated in FIG. 3) may be directly coupled to the eighth rail surface 345 of the second fuel rail 372 and may extend along the first fuel line 387 to electrically couple the fifteenth thermocouple 358 to the control unit 309.

The other connections coupled to the second fuel rail are also arranged similar to the arrangement described above. For example, the sixteenth thermocouple 344, seventeenth thermocouple 352, and eighteenth thermocouple 360 are individually electrically coupled to the control unit 309 via sixteenth connection 361, seventeenth connection 369, and eighteenth connection 355 (respectively), with the sixteenth connection 361 extending along the sixth rail surface 341 and first fuel line 387, the seventeenth connection 369 extending along the seventh rail surface 343 and first fuel line 387, and the eighteenth connection 355 extending along the eighth rail surface 345 and first fuel line 387. The nineteenth thermocouple 346, twentieth thermocouple 354, and twenty-first thermocouple 362 are individually electrically coupled to the control unit 309 via nineteenth connection 363, twentieth connection 371, and twenty-first connection 357 (respectively), with the nineteenth connection 363 extending along the sixth rail surface 341 and first fuel line 387, the twentieth connection 371 extending along the seventh rail surface 343 and first fuel line 387, and the twenty-first connection 357 extending along the eighth rail surface 345 and first fuel line 387. The twenty-second thermocouple 348, twenty-third thermocouple 356, and twenty-fourth thermocouple 364 are individually coupled to the control unit 309 via twenty-second connection 365, twenty-third connection 373, and twenty-fourth connection 385 (respectively), with the twenty-second connection 365 extending along the sixth rail surface 341 and first fuel line 387, the twenty-third connection 373 extending along the seventh rail surface 343 and first fuel line 387, and the twenty-fourth connection 385 extending along the eighth rail surface 345 and first fuel line 387.

Inset 349 shows an enlarged view of a portion of the second fuel rail 372 proximate to the fifth fuel injector 376, including thirteenth connection 359 coupled to thirteenth thermocouple 342, and fourteenth connection 367 coupled to fourteenth thermocouple 350. Each connection and thermocouple shown by FIG. 3 (e.g., the first, second, and third pluralities of metal film thermocouples and their corresponding connections to the control unit 309) includes a configuration similar to the configuration shown by inset 349. Specifically, each connection described above includes two metal-film connectors (such as first metal-film connector 394 and second metal-film connector 395 shown by inset 349), with each metal-film connector coupled to a separate leg (such as first leg 396 and second leg 398 shown by inset 349) of a thermocouple (such as thirteenth thermocouple 342). In other words, each thermocouple of each plurality of metal film thermocouples (e.g., each thermocouple of each of the first plurality of metal film thermocouples coupled to the first fuel rail 370, the second plurality of metal film thermocouples coupled to the second fuel rail 372, and the third plurality of metal film thermocouples coupled to the first fuel line 387) individually includes a first leg and a second leg. The first leg of each thermocouple is directly coupled to a first connector of a corresponding connection and the second leg of each thermocouple is directly coupled to a second connector of the corresponding connection. The first and second legs of each thermocouple are directly bonded to a surface of a corresponding fuel rail where each thermocouple is coupled and are arranged parallel to the bonded surface.

In reference to inset 349 (and as an example configuration of each thermocouple and each corresponding connection described above during the discussion of FIG. 3), the first leg 396 may be formed of a first metal film and the second leg 398 may be formed of a second metal film, with both legs directly coupled (e.g., directly bonded) to a surface of a fuel rail (for example, the first and second legs shown in inset 349 are directly bonded to the sixth rail surface 341). The first metal-film connector 394, the second metal-film connector 395, the first leg 396, and the second leg 398 may be electrically conductive and may be electrically isolated from the surface to which they are bonded (e.g., the bonded surface of the fuel rail, such as sixth rail surface 341, may have a decreased electrical conductivity relative to the connectors). The first leg 396 and the second leg 398 of the thirteenth thermocouple 342 are directly and electrically coupled to each other at a leg junction 397.

A representative example of operation of each thermocouple and its corresponding coupled connectors is herein described by operation of the thirteenth thermocouple 342 as well as the first metal-film connector 394 and second metal-film connector 395 of thirteenth connection 359. A change in temperature of the sixth rail surface 341 may result in a temperature gradient (e.g., temperature difference) across the first leg 396, second leg 398, and the corresponding connectors (e.g., first metal-film connector 394 and second metal-film connector 395). Due to the dissimilar metal films of the thirteenth thermocouple 342 (e.g., the first leg 396 formed of the first metal film and the second leg 398 formed of the second metal film), the temperature change of the sixth rail surface 341 may result in an increased or decreased electrical voltage across the thermocouple and connectors (e.g., due to the Seebeck effect). The resulting increase or decrease in electrical voltage may increase or decrease an electrical current within the first and second connectors. The control unit 309 may then measure the change in electrical current within the first and second connectors in order to determine the change in temperature of the sixth rail surface 341 at the location where the thirteenth thermocouple 342 is coupled to the sixth rail surface 341.

Each fuel injector of the first injector group and the second injector group individually includes an electrical input (such as first electrical input 311 coupled to first fuel injector 326, or fifth electrical input 351 coupled to fifth fuel injector 376). In one example, a direct injection driver (such as the first direct injection driver 238 or second direct injection driver 239 shown by FIG. 2) may include electrical connections (not shown by FIG. 3) configured to interface with the electrical inputs of each fuel injector. As described during the discussion of FIG. 2, a controller (such as controller 222 shown by FIG. 2) may be electrically coupled to the electrical inputs of the fuel injectors via the direct injection drivers. The controller may also be electrically coupled to the control unit 309. In this way, each fuel injector may be actuated by a fuel injection driver in response to a signal from the controller transmitted to the fuel injection driver. The signal transmitted from the controller to the fuel injection driver may be in response to one or more signals (e.g., temperature readings from the thermocouples) transmitted to the controller from the control unit 309, as described below in reference to FIG. 4.

Due to differences in the locations of the thermocouples relative to the control unit 309, the control unit 309 may receive electrical signals (e.g., electrical current) from the thermocouples at different rates. For example, a change in magnitude of an electrical current from the twenty-second thermocouple 348 may be received and processed (as described below in the discussion of FIG. 5) by control unit 309 faster than a change in magnitude of an electrical current from thirteenth thermocouple 342. As a result, without compensating a response of the controller (e.g., a response such as actuation of a high pressure fuel pump, adjustment of a fuel injector nozzle opening time, etc. as described below in the discussion of FIG. 5) to the different rates at which signals are received from the control unit 309 (e.g., without adjusting the control unit for signal latency or transport delay) the response of the controller to a signal (e.g., temperature reading) from the twenty-second thermocouple 348 (for example) may not be in phase with a response of the controller to a signal from the thirteenth thermocouple 342 (for example). To compensate for the issues described above, the control unit 309 may include instructions stored in non-transitory memory to adjust a transmission time (e.g., responses to signals received from thermocouples) of signals from the control unit 309 to the controller based on a distance of the control unit 309 from one or more thermocouples. In one example, the controller (e.g., engine controller) may delay adjusting a pressure of a fuel within a fuel rail and/or may delay adjusting a fuel injector nozzle opening time (as described below in reference to FIG. 5) until the control unit 309 has transmitted a signal to the controller including a temperature reading from each thermocouple electrically coupled to the control unit 309.

In another example, a plurality of thermocouples (for example, the first thermocouple 302 and the twelfth thermocouple 324) may transmit signals to the control unit 309 at a first time t1. The control unit 309 may receive the signal from the twelfth thermocouple 324 at a second time t2, with the second time t2 occurring an amount of time after the first time t1 (e.g., occurring after an amount of time lapses for the signal to travel from the twelfth thermocouple 324, through the twelfth connection 368, and to the control unit 309). However, the control unit 309 may receive the signal from the first thermocouple 302 at a third time t3, with the third time t3 occurring an amount of time after the second time t2 due to the increased distance of the first thermocouple 302 from the control unit 309 compared to the distance of the twelfth thermocouple 324 from the control unit 309. In other words, the control unit 309 may receive the signal from the first thermocouple 302 an amount of time after it receives a signal from the twelfth thermocouple 324, and the amount of time may increase as the distance between the control unit 309 and the first thermocouple 302 is increased. In response, the control unit 309 may adjust the signal (e.g., temperature reading) received at the second time t2 from the twelfth thermocouple 324 and the signal received at the third time t3 from the first thermocouple 302 when storing the temperature readings into memory so that both signals correspond to a temperature reading at the first time t1. In this way, the control unit 309 may transmit temperature readings corresponding to a certain time to the controller (e.g., engine controller) from each of the thermocouples by adjusting the corresponding times of individual temperature readings based on distances of the thermocouples from the control unit 309.

In a third example, the controller may delay the adjustments described above until the control unit 309 has transmitted a signal to the controller including time-averaged values of the temperature readings from each thermocouple in order to reduce a phase difference of adjustments to nozzle opening times. Further embodiments may include alternate methods, control unit configurations, and/or controller configurations to compensate for signal latency and increase controller response time. Further embodiments may also include combinations of one or more of the examples discussed above.

FIG. 4 depicts components of the embodiment of the fuel injection system 300 from FIG. 3 in a second perspective view. Fuel flows from each of the fuel injectors are shown. Specifically, a first fuel flow 400 from first fuel injector 326, a second fuel flow 402 from second fuel injector 328, a third fuel flow 404 from third fuel injector 330, a fourth fuel flow 406 from fourth fuel injector 332, a fifth fuel flow 408 from fifth fuel injector 376, a sixth fuel flow 410 from sixth fuel injector 378, a seventh fuel flow 412 from seventh fuel injector 380, and an eighth fuel flow 414 from eighth fuel injector 382 are shown. Additionally, the first nozzle 327, second nozzle 329, third nozzle 331, and fourth nozzle 333 (the locations of which were indicated in FIG. 3) are shown unobscured by other components of the fuel injection system 300.

As described above in reference to FIG. 3, each fuel injector includes an electrical input that may interface with direct injection drivers (such as the direct injection drivers shown by FIG. 2). In one example, the direct injection drivers may be configured to transmit an electrical current to each electrical input (such as first electrical input 311, or fifth electrical input 351) from an electrical energy source of the engine (such as a battery, an alternator, etc.) in response to a signal from the controller (such as controller 222 shown by FIG. 2). A magnitude and duration of electrical current transmitted to the electrical input of each fuel injector may be adjusted by the controller in response to signals (e.g., temperature readings) from the control unit 309 in order to adjust an opening time of a nozzle coupled to each fuel injector. For example, the controller may actuate a solenoid (not shown) within the first fuel injector 326 by transmitting a pulse of electrical current to a fuel injection driver electrically coupled to the electrical input of the first fuel injector 326 in order to adjust an opening time of the first nozzle 327. In this way, the first fuel flow 400 may be increased or decreased based on a signal from the control unit 309 to the controller, with the signal from the control unit 309 based on temperature readings from thermocouples proximate to the first fuel injector 326 (such as first thermocouple 302).

The nozzle opening times (and fuel flows) may be adjusted by the controller in response to electrical signals transmitted to the controller from the control unit electrically coupled to the thermocouples, as discussed in further detail below with reference to FIG. 5. In other words, an electrical output of the thermocouples coupled to a fuel rail may be interpreted by the control unit to determine a temperature of the fuel rail at a plurality of locations (e.g., the locations where the thermocouples are coupled to the fuel rail), and in response to the determined temperatures, the control unit may transmit a signal to the controller to adjust the nozzle opening times (and therefore the fuel flows). Further examples of adjustments to components of the fuel injection system by the controller and control unit in response to thermocouple output are provided below in the discussion of FIG. 5.

FIGS. 3-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 5 depicts a method 500 for determining a temperature of fuel within a fuel rail (such as the first fuel rails and/or second fuel rails shown by FIGS. 2-4) of an engine fuel injection system (such as the fuel injection systems shown by FIGS. 1-4) and adjusting engine operating conditions in response to the determined temperature. Instructions for carrying out method 500 and the rest of the methods included herein may be executed by a controller (such as the controller shown by FIGS. 1-2) based on instructions stored on a memory of the controller and in conjunction with signals received from a control unit (such as the control unit shown by FIGS. 2-4) and sensors of the engine system, such as the sensors (e.g., thermocouples, speed sensors, etc.) described above with reference to FIGS. 1-4. The controller may employ engine actuators of the engine system (e.g., such as HPP 214 shown by FIG. 2, fuel injectors shown by FIGS. 1-4, etc.) to adjust engine operation, according to the methods described below.

In one example, the method includes determining a temperature at each of a plurality of locations along a surface of an engine fuel rail (such as the first fuel rails and/or second fuel rails shown by FIGS. 2-4) based on electrical current generated by a corresponding thermocouple of a plurality of thermocouples (such as the thermocouples shown by FIGS. 2-4), each thermocouple of the plurality of thermocouples bonded to one of the plurality of locations; and adjusting nozzle opening times of a plurality of fuel injectors (such as the fuel injectors shown by FIGS. 1-4), each coupled to the fuel rail at one of the plurality of locations, in response to the determined temperature at each of the plurality of locations.

Method 500 includes estimating and/or measuring engine operating conditions at 502 based on one or more outputs of various sensors in the engine system and/or operating conditions of the engine system (e.g., such as various temperature sensors, pressure sensors, etc., as described above). Engine operating conditions may include engine speed and load, rate of engine load increase, fuel pressure, pedal position, fuel injector nozzle opening times, mass air flow rate, turbine speed, compressor inlet pressure, emission control device temperature, etc.

At 504, the method includes determining whether a temperature of ambient air (e.g., atmospheric air surrounding the engine and the fuel injection system) is less than a threshold temperature. In one example, the threshold temperature may be based on a minimum temperature for a desired precision of an output of the thermocouples. For example, the precision of the output of the thermocouples (e.g., a constancy of a magnitude of an electrical current generated by the thermocouples) may decrease as the temperature of ambient air decreases towards the threshold temperature.

If the temperature of the ambient air is less than the threshold temperature at 504, the method continues to 506 where the method includes maintaining current fuel injector nozzle opening times. In one example, as a result of the temperature of the ambient air being less than the threshold temperature, a desired precision of the output of the thermocouples may not be attainable. In response, the controller may maintain (e.g., not adjust) an opening time of fuel injector nozzles. In other words, the opening times of the fuel injector nozzles are not increased or decreased based on the output of the thermocouples when the precision of the output of the thermocouples is low (e.g., when the ambient temperature approaches the threshold temperature).

If the temperature of the ambient air is not less than the threshold temperature at 504, the method continues to 508 where the method includes reading a temperature of the fuel rail and/or a fuel line at each thermocouple location. For example, reading the temperature of the fuel rail and/or fuel line may include measuring a magnitude of an electrical current generated by each thermocouple and storing the measured magnitudes in the memory of the control unit. The control unit may then apply a function stored in non-transitory memory to the magnitudes of electrical current in order to convert the measured electrical currents into temperatures readings of the fuel rail and/or fuel line. In one example, a fuel injection system may include two fuel rails, one fuel line, and twenty-six thermocouples (with twelve thermocouples coupled to each fuel rail and two thermocouples coupled to the fuel line, as shown by FIGS. 3-4). The temperatures read at 508 (e.g., measured temperatures by measuring electrical current as described above) may then include temperatures of the fuel rail and fuel line at each of the twenty-six locations where the thermocouples are coupled to the components of the fuel injection system.

The method at 508 may include adjusting times of individual temperature readings based on distances of the thermocouples from the control unit such that each temperature reading from a single group of temperature readings (e.g., one temperature reading from each thermocouple) may be stored with a same time of measurement (e.g., stored as if each measurement occurred simultaneously and without delays due to differences in distances between the thermocouples and the control unit) in the memory of the control unit, as described above during the discussion of FIG. 3.

The method continues to 510 where the method includes applying a transfer function to the measured temperatures (e.g., temperature readings) of the fuel rail to determine a temperature of fuel within the fuel rail at each location of measurement. Determining a temperature of the fuel within the fuel rail at the plurality of locations may include using the control unit (configured with the transfer function stored in non-transitory memory) to apply the transfer function to the temperatures of the fuel rail determined at 508 based on electrical signals (e.g., electrical current) generated by the thermocouples. In one example, the transfer function stored in non-transitory memory may be configured to determine the temperature of fuel within the fuel rail for a specific geometry (e.g., thickness, number of surfaces, etc.) and/or material composition of the fuel rail. In another example, the transfer function may be one of a plurality of transfer functions stored in non-transitory memory of the control unit, and the control unit may select an appropriate transfer function from the plurality of transfer functions based on configuration of the fuel rail as described above (e.g., specific geometry and/or material composition of the fuel rail). In this way, the control unit may be configured to determine the temperature of fuel within the fuel rail for one or more fuel rail types.

In one example of embodiments in which separate pluralities of thermocouples are proximate (e.g., proximate as described above during the discussion of FIG. 3) to each fuel injector (such as the embodiment shown by FIG. 3, with the first thermocouple 302, second thermocouple 310, and third thermocouple 318 proximate to the first fuel injector 326, and a different plurality of thermocouples proximate to each other fuel injector), the transfer function may combine temperatures of fuel within the fuel rail at locations of each thermocouple proximate to a certain fuel injector to form an average temperature for the fuel within the fuel rail at the location of that fuel injector. For example, temperatures of the fuel within the fuel rail at the locations of the first thermocouple 302, second thermocouple 310, and third thermocouple 318 may be combined into a weighted averaged (for example, based on a distance of each thermocouple from the fuel injector) to determine a temperature of the fuel within the fuel rail at the location of the first fuel injector 326.

The method continues to 512 where the method includes determining whether at least one fuel temperature is greater than a threshold temperature. In other words, each temperature of fuel determined above at the plurality of locations is compared to the threshold fuel temperature in order to determine whether at least one of the temperatures is greater than the threshold temperature. In one example, the threshold fuel temperature may be based on a temperature of vaporization of the fuel within the fuel rail. For example, if a pressure of the fuel within the fuel rail is approximately constant and uniform throughout the fuel rail, the temperature of vaporization may be a temperature at which the fuel changes state from a liquid to a gas. If the pressure of fuel within the fuel rail increases or decreases, the temperature of vaporization may also increase or decrease. As a result, the threshold fuel temperature may be dependent on the pressure of the fuel within the fuel rail (as determined by a fuel rail pressure sensor, such as the fuel rail pressure sensors shown by FIG. 2).

If there is not at least one temperature greater than the threshold fuel temperature as determined at 512, the method continues to 516 (as described below).

However, if at least one temperature is greater than the threshold fuel temperature as determined at 512, the method continues to 514 where the method includes raising the pressure of fuel within the fuel rail with a high pressure fuel pump coupled to the fuel rail. For example, due to at least one temperature exceeding the threshold fuel temperature, a risk of fuel vaporization within the fuel rail may be increased. In response, the high pressure fuel pump (such as HPP 214 shown by FIG. 2) may be actuated by the controller in response to a signal transmitted from the control unit to increase the pressure of the fuel within the fuel rail in order to reduce the risk of fuel vaporization. Increasing the pressure of the fuel within the fuel rail may simultaneously increase the temperature of fuel vaporization (as described above in reference to 512). In one example, the pressure of the fuel within the fuel rail may be increased until the temperatures of the fuel within the fuel rail are not greater than the threshold fuel temperature (with the threshold fuel temperature increasing as the fuel pressure increases).

If there is not at least one temperature greater than the threshold fuel temperature as determined at 512, or if the pressure of the fuel within the fuel rail has been increased at 514, the method continues to 516 where the method includes determining whether the engine load is increasing at a rate greater than a threshold rate. For example, during a tip-in, engine torque demand may be increasing, resulting in an increasing engine load. In one example, the increasing engine load may be based on a comparison made by the controller of a current engine load measurement against a previous engine load measurement.

If the controller determines that the engine load is increasing at a rate greater than a threshold rate at 516, the method continues to 520 where the method includes uniformly adjusting all injector nozzle opening times to deliver a controlled volume of fuel to the cylinders. In one example, the fuel injector nozzle opening times may be adjusted to a same opening time, with the same opening time based on both of an averaged value for current nozzle opening times and an estimated amount of engine load increase. In other words, each of the opening times of the fuel injector nozzles may be adjusted in unison so that after the adjustment each fuel injector nozzle has the same opening time, and the adjusted opening times may be greater than the average value of nozzle opening times as determined prior to the adjustment. For example, when engine load rapidly increases, the temperature of the fuel rail may increase more rapidly than a temperature of each thermocouple of the plurality of thermocouples. In response to the rapid increase in engine load, fuel injector nozzle opening times may be uniformly increased by the controller to compensate for a delay in thermocouple response (e.g., a delay in an increase of thermocouple output).

If the controller determines that the engine load is not increasing at a rate greater than a threshold rate at 516, the method continues to 522 where the method includes determining whether each of the temperatures of the fuel within the fuel rail are within a relative range. In a first example, a difference of each temperature from each other temperature is calculated by the control unit, and the calculated differences may be compared to a threshold difference (e.g., a threshold range). In one example, the threshold difference may be based on the precision of the thermocouple output (as described above in reference to 504). In other words, the threshold difference may correspond to an acceptable margin of error in the measurement (by the control unit) of the magnitudes of electrical current generated by the thermocouples. In a second example, a difference of each temperature from an averaged value (e.g., mean value) of the temperatures may be calculated by the control unit, and the calculated differences may be compared to a threshold difference. In other words, each temperature may be compared to a first threshold temperature and a second threshold temperature in order to determine whether each temperature is above the first threshold temperature and below the second threshold temperature. The first threshold temperature may be based on an amount below the average value of the temperatures at the plurality of locations, while the second threshold temperature may be based on an amount above the average value of the temperatures at the plurality of locations.

If each of the temperatures of the fuel within the fuel rail are within a relative range (e.g., such as the examples described above) at 522, the method continues to 518 where the method includes determining an average fuel density of fuel within the fuel rail based on fuel type and average fuel temperature. The control unit may calculate the average temperature of fuel within the fuel rail based on each of the temperatures of the fuel at the plurality of locations. The control unit may then calculate the average density of the fuel using instructions stored in non-transitory memory based on fuel type. For example, a fuel (e.g., gasoline) may have a first density at a first temperature and first pressure, and may have a second density at a second temperature and second pressure. Instructions stored in non-transitory memory of the control unit may include information about the density of at least one fuel type at a plurality of temperatures and pressures in order to determine the average fuel density at all of the plurality of locations based on the average fuel temperature at all of the plurality of locations.

The method then continues to 520 where the method includes uniformly adjusting all injector nozzle opening times to deliver a controlled volume of fuel to each cylinder of the engine. The controller may calculate the adjustment to injector nozzle opening times based on a signal received from the control unit, wherein the signal includes the average fuel density determined at 518. As an example, based on engine operating conditions (e.g., engine speed, torque demand, air intake flow, etc.), the controller may be configured to actuate the fuel injectors to deliver a specific amount of fuel to the cylinders of the engine. If the average fuel density (as determined by the control unit) is increased, the injector nozzle opening times may be decreased by the controller in order to deliver the specific amount of fuel to the cylinders. If the average fuel density (as determined by the control unit) is decreased, the injector nozzle opening times may be increased by the controller to deliver the same specific amount of fuel to the cylinders. In one example, uniformly adjusting all injector nozzle opening times may include simultaneously adjusting all nozzle opening times to the same opening time. Due to each temperature of the fuel within the fuel rail being within the relative range as described above at 522, the average density determined at 518 may closely approximate the density of the fuel at each fuel injector location. In this way, by opening each fuel injector nozzle to the same opening time, each fuel injector may inject approximately a same amount of fuel into each cylinder. In another example, uniformly adjusting all injector nozzle opening times may include simultaneously increasing or decreasing each of the nozzle opening times by a same amount. Due to the average density closely approximating the density of the fuel at each fuel injector location as described above, increasing or decreasing the nozzle opening times of each fuel injector nozzle by the same amount may increase or decrease an amount of fuel delivered to each cylinder by a same amount.

If at least one of the temperatures of the fuel within the fuel rail is not within the relative range at 522, the method continues to 524 where the method includes determining a fuel density of fuel within the fuel rail at each injector location based on fuel type, pressure, and fuel temperature at each injector location. In other words, the control unit may calculate the density of fuel within the fuel rail at the plurality of locations based on the temperatures of the fuel at the plurality of locations using instructions stored in non-transitory memory for the fuel type. For example, a fuel (e.g., gasoline) may have a first density at a first temperature and first pressure, and may have a second density at a second temperature and second pressure. Instructions stored in non-transitory memory of the control unit may include information (e.g., a characteristic pressure-temperature curve) about the density of at least one fuel type for a plurality of temperatures and pressures. The density information may be used by the control unit in order to determine fuel density at each of the plurality of locations based on fuel temperature at each of the plurality of locations.

The method then continues to 526 where the method includes individually adjusting one or more fuel injector nozzle opening times to deliver a controlled volume of fuel to the cylinders. For example (as described above with reference to 520), based on engine operating conditions the controller may be configured to actuate the fuel injectors to deliver a specific amount of fuel to the cylinders of the engine. If a first location of the plurality of locations is determined to be at a first temperature by the control unit, and a second location of the plurality of locations is determined to be at a different, second temperature by the control unit, the control unit may transmit a signal to the controller and the controller may separately adjust the nozzle opening times of the fuel injectors at the first and second locations in order to deliver the specific amount of fuel to the corresponding cylinders. In one example, if the first temperature is greater than the second temperature (e.g., a density of fuel at the first temperature is less than a density of fuel at the second temperature), a nozzle opening time of the fuel injector at the first location may be increased while a nozzle opening time of the fuel injector at the second location may be decreased. In this way, a similar amount of fuel may be delivered to each cylinder by separately adjusting nozzle opening times for each fuel injector based on temperatures at each of the plurality of locations.

In this way, a fuel injection system including at least one fuel rail, a plurality of fuel injectors coupled to the at least one fuel rail, and a plurality of thermocouples (e.g., metal film thermocouples) directly bonded to the at least one fuel rail may determine a temperature of fuel within each fuel rail at a plurality of locations (e.g., locations at which each thermocouple is directly bonded to a surface of the at least one fuel rail). For example, each thermocouple of the plurality of thermocouples may be proximate to a fuel injector of the plurality of fuel injectors. Each thermocouple may be configured to transmit a signal to a control unit of the fuel injection system based on a temperature of the at least one fuel rail at locations where each thermocouple is directly bonded to one or more surfaces of the at least one fuel rail. The control unit may be configured to transmit the determined temperatures to a controller of an engine (e.g., an engine computer), and the controller may adjust fuel injection system conditions in response to the determined temperatures.

The technical effect of directly bonding a plurality of metal film thermocouples to at least one fuel rail of a fuel injection system is to determine a temperature of the at least one fuel rail at a plurality of locations along each fuel rail. In this way, a controller in communication (e.g., electrically coupled) with a control unit may adjust opening times of nozzles coupled to each fuel injector of the fuel injection system in response to fuel rail temperatures (determined by the control unit) in order to inject a controlled amount of fuel into cylinders of an engine. By injecting a controlled amount of fuel based on fuel rail temperatures, engine performance (e.g., time to torque) may be increased. The controller may also actuate a high pressure fuel pump in response to the fuel rail temperatures determined by the control unit in order to increase a fuel pressure within the at least one fuel rail. By adjusting fuel pressure in response to fuel rail temperatures, a vaporization temperature of the fuel may be increased. In this way, a likelihood of fuel vaporizing within each fuel rail may be reduced and engine degradation may be decreased.

In one embodiment, a fuel injection system includes: at least one fuel rail; a plurality of fuel injectors coupled to the at least one fuel rail; and a plurality of metal film thermocouples directly bonded to the at least one fuel rail. In a first example of the fuel injection system, at least one thermocouple of the plurality of thermocouples is arranged proximate to each fuel injector of the plurality of fuel injectors. A second example of the fuel injection system optionally includes the first example, and further includes wherein each fuel injector is coupled to a first fuel rail surface of the at least one fuel rail and wherein, for and proximate to each fuel injector: a first thermocouple of the plurality of thermocouples is directly bonded to a second fuel rail surface of the at least one fuel rail, the second fuel rail surface perpendicular to the first fuel rail surface, a second thermocouple of the plurality of thermocouples is directly bonded to a third fuel rail surface of the at least one fuel rail, the third fuel rail surface perpendicular to the first fuel rail surface and parallel to the second fuel rail surface, and a third thermocouple of the plurality of thermocouples is directly bonded to a fourth fuel rail surface of the at least one fuel rail, the fourth fuel rail surface perpendicular to the second and third fuel rail surfaces and parallel to the first fuel rail surface. A third example of the fuel injection system optionally includes one or both of the first and second examples, and further includes exactly two fuel rails, with a first fuel rail of the two fuel rails arranged proximate and parallel to a first cylinder bank of an engine, and a second fuel rail of the two fuel rails arranged proximate and parallel to a second cylinder bank of the engine. A fourth example of the fuel injection system optionally includes one or more or each of the first through third examples, and further includes wherein the first fuel rail is coupled to the second fuel rail by a fuel line and further comprising: a first fuel line thermocouple directly coupled to the fuel line and arranged proximate to the first fuel rail; and a second fuel line thermocouple directly coupled to the fuel line arranged proximate to the second fuel rail. A fifth example of the fuel injection system optionally includes one or more or each of the first through fourth examples, and further includes wherein each thermocouple of the plurality of thermocouples is individually electrically coupled to a controller via a plurality of metal film connectors. A sixth example of the fuel injection system optionally includes one or more or each of the first through fifth examples, and further includes wherein each thermocouple includes a first leg comprised of a first metal film and a second leg comprised of a second metal film. A seventh example of the fuel injection system optionally includes one or more or each of the first through sixth examples, and further includes wherein the plurality of metal film connectors extend along a length of at least one surface of the fuel rail and the plurality of thermocouples are arranged parallel to the at least one surface In another embodiment, a method includes: determining a temperature at each of a plurality of locations along a surface of an engine fuel rail based on electrical current generated by a corresponding thermocouple of a plurality of thermocouples, each thermocouple of the plurality of thermocouples bonded to one of the plurality of locations; and adjusting nozzle opening times of a plurality of fuel injectors, each coupled to the fuel rail at one of the plurality of locations, in response to the determined temperature at each of the plurality of locations. In a first example of the method, adjusting opening times of the plurality of fuel injectors is responsive to the temperature of at least one of the plurality of locations being outside a threshold temperature range, where the threshold temperature range is an amount above or below an average temperature for all of the plurality of locations, and wherein adjusting the opening times includes adjusting an opening time of each fuel injector of the plurality of fuel injectors based on an output of the corresponding thermocouple. A second example of the method optionally includes the first example, and further includes wherein adjusting opening times of the plurality of fuel injectors is responsive to the temperature at each of the plurality of locations being within a threshold temperature range, where the threshold temperature range is an amount above or below an average temperature for all of the plurality of locations, and wherein adjusting the opening times includes adjusting opening times of the plurality of fuel injectors to a same opening time, and wherein the same opening time is based on the average temperature for all of the plurality of locations. A third example of the method optionally includes one or both of the first and second examples, and further includes determining a temperature of a fuel within the fuel rail at the plurality of locations via a controller configured to apply a transfer function to electrical signals generated by the thermocouples. A fourth example of the method optionally includes one or more or each of the first through third examples, and further includes adjusting a fuel pressure within the engine fuel rail in response to the determined fuel temperature via actuation of a fuel pump coupled to the fuel rail. A fifth example of the method optionally includes one or more or each of the first through fourth examples, and further includes wherein adjusting the fuel pressure within the engine fuel rail includes raising the fuel pressure within the fuel rail in response to fuel temperature of at least one location exceeding a threshold temperature. A sixth example of the method optionally includes one or more or each of the first through fifth examples, and further includes determining fuel density at each fuel injector via the controller configured to calculate fuel density based on fuel temperature and fuel type at each fuel injector, and wherein adjusting opening times of the plurality of fuel injectors includes individually adjusting one or more injector nozzle opening times in response to fuel density at each fuel injector. A seventh example of the method optionally includes one or more or each of the first through sixth examples, and further includes determining an average fuel density at all of the plurality of locations based on an average temperature at all of the plurality of locations via the controller configured to calculate fuel density based on fuel temperature and fuel type at all of the plurality of fuel injectors, and wherein adjusting opening times of the plurality of fuel injectors includes uniformly adjusting all injector nozzle opening times in response to the average fuel density. An eighth example of the method optionally includes one or more or each of the first through seventh examples, and further includes not adjusting the injector nozzle opening time of each fuel injector in response to fuel rail temperature decreasing below a threshold temperature. A ninth example of the method optionally includes one or more or each of the first through eighth examples, and further includes wherein the nozzle opening times of the plurality of fuel injectors are each increased in response to a rapid increase in engine load.

In one embodiment of a fuel system for an engine, the fuel system for an engine includes: a first fuel rail including a first plurality of fuel injectors coupled to the first fuel rail; a second fuel rail including a second plurality of fuel injectors coupled to the second fuel rail; a first plurality of thermocouples comprised of a metal film, each thermocouple of the first plurality of thermocouples bonded to a surface of the first fuel rail proximate to one of the first plurality of fuel injectors; a second plurality of thermocouples comprised of a metal film, each thermocouple of the second plurality of thermocouples bonded to a surface of the second fuel rail proximate to one of the second plurality of fuel injectors; and a single control unit electrically coupled to each of the first plurality of thermocouples and the second plurality of thermocouples; and a controller including non-transitory memory with computer readable instructions for: individually adjusting an injection timing of the plurality of fuel injectors in response to electrical signals from the plurality of thermocouples. In a first example of the fuel injection system for an engine, an engine controller is in communication with the single control unit and including non-transitory memory with computer readable instructions for adjusting an injection timing of the first and second plurality of fuel injectors in response to electrical signals received from the first and second plurality of thermocouples via the single control unit.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel injection system, comprising:
    at least one fuel rail;
    a plurality of fuel injectors coupled to the fuel rail; and
    a plurality of metal film thermocouples directly bonded to the fuel rail, where, for each fuel injector of the plurality of fuel injectors, a corresponding, different thermocouple of the plurality of thermocouples is positioned closer to the fuel injector than each other fuel injector of the plurality of fuel injectors.

2. The fuel injection system of claim 1, wherein at least one thermocouple of the plurality of thermocouples is arranged proximate to each fuel injector of the plurality of fuel injectors.

3. The fuel injection system of claim 2, wherein each fuel injector is coupled to a first fuel rail surface of the fuel rail and wherein, for and proximate to each fuel injector: a first thermocouple of the plurality of thermocouples is directly bonded to a second fuel rail surface of the fuel rail, the second fuel rail surface perpendicular to the first fuel rail surface, a second thermocouple of the plurality of thermocouples is directly bonded to a third fuel rail surface of the fuel rail, the third fuel rail surface perpendicular to the first fuel rail surface and parallel to the second fuel rail surface, and a third thermocouple of the plurality of thermocouples is directly bonded to a fourth fuel rail surface of the fuel rail, the fourth fuel rail surface perpendicular to the second and third fuel rail surfaces and parallel to the first fuel rail surface.

4. The fuel injection system of claim 1, further comprising exactly two fuel rails, with a first fuel rail of the two fuel rails arranged proximate and parallel to a first cylinder bank of an engine, and a second fuel rail of the two fuel rails arranged proximate and parallel to a second cylinder bank of the engine.

5. The fuel injection system of claim 4, wherein the first fuel rail is coupled to the second fuel rail by a fuel line and further comprising:
    a first fuel line thermocouple directly coupled to the fuel line and arranged proximate to the first fuel rail; and
    a second fuel line thermocouple directly coupled to the fuel line arranged proximate to the second fuel rail.

6. The fuel injection system of claim 1, wherein each thermocouple of the plurality of thermocouples is individually electrically coupled to a common control unit via a plurality of metal film connectors, and wherein each thermocouple includes a first leg comprised of a first metal film and a second leg comprised of a second metal film.

7. The fuel injection system of claim 6, wherein, for each fuel injector of the plurality of fuel injectors, a distance from the corresponding thermocouple of the plurality of thermocouples to the fuel injector along the fuel rail is smaller than a distance from the corresponding thermocouple to each adjacent fuel injector of the plurality of fuel injectors.

8. The fuel injection system of claim 6, wherein the plurality of metal film connectors extends along a length of at least one surface of the fuel rail and the plurality of thermocouples are arranged parallel to the at least one surface.

9. A method, comprising:
   determining a temperature at each of a plurality of locations along a surface of an engine fuel rail based on electrical current generated by a corresponding thermocouple of a plurality of thermocouples, each thermocouple of the plurality of thermocouples bonded to one of the plurality of locations; and
   adjusting nozzle opening times of a plurality of fuel injectors, each coupled to the engine fuel rail at one of the plurality of locations, in response to the determined temperature at each of the plurality of locations, wherein adjusting nozzle opening times of the plurality of fuel injectors is responsive to the determined temperature of at least one of the plurality of locations being outside a threshold temperature range, the threshold temperature range being an amount above or below an average temperature for all of the plurality of locations, and wherein adjusting the nozzle opening times includes adjusting a nozzle opening time of each fuel injector of the plurality of fuel injectors based on an output of the corresponding thermocouple.

10. The method of claim 9, wherein adjusting nozzle opening times of the plurality of fuel injectors is responsive to the temperature at each of the plurality of locations being within the threshold temperature range, where the threshold temperature range is an amount above or below the average temperature for all of the plurality of locations, and wherein adjusting the nozzle opening times includes adjusting nozzle opening times of the plurality of fuel injectors to a same nozzle opening time, and wherein the same nozzle opening time is based on the average temperature for all of the plurality of locations.

11. The method of claim 9, further comprising determining a temperature of a fuel within the engine fuel rail at each of the plurality of locations via a controller, where the determining the temperature of the fuel includes applying a transfer function to electrical signals generated by the thermocouples.

12. The method of claim 11, further comprising adjusting a fuel pressure within the engine fuel rail in response to the determined fuel temperature via actuation of a fuel pump coupled to the engine fuel rail.

13. The method of claim 12, wherein adjusting the fuel pressure within the engine fuel rail includes raising the fuel pressure within the engine fuel rail in response to fuel temperature of at least one location exceeding a threshold temperature.

14. The method of claim 11, further comprising determining a fuel density of fuel at each fuel injector via the controller based on the determined temperature and a fuel type at each fuel injector, and wherein adjusting nozzle opening times of the plurality of fuel injectors includes individually adjusting one or more injector nozzle opening times in response to the determined fuel density at each fuel injector.

15. The method of claim 11, further comprising determining an average fuel density at all of the plurality of locations based on an average temperature at all of the plurality of locations via the controller based on a fuel type and the determined temperature at each of the plurality of fuel injectors, and wherein adjusting nozzle opening times of the plurality of fuel injectors includes uniformly adjusting all injector nozzle opening times in response to the average fuel density.

16. The method of claim 9, further comprising not adjusting the injector nozzle opening time of each fuel injector in response to ambient temperature decreasing below a threshold temperature.

17. The method of claim 9, further comprising adjusting the nozzle opening times of the plurality of fuel injectors in response to a rapid increase in engine load and not based on the determined temperature at each of the plurality of locations.

18. A fuel system for an engine, comprising:
   a first fuel rail including a first plurality of fuel injectors coupled to the first fuel rail;
   a second fuel rail including a second plurality of fuel injectors coupled to the second fuel rail;
   a first plurality of thermocouples comprised of a metal film, each thermocouple of the first plurality of thermocouples bonded to a surface of the first fuel rail proximate to one of the first plurality of fuel injectors;
   a second plurality of thermocouples comprised of a metal film, each thermocouple of the second plurality of thermocouples bonded to a surface of the second fuel rail proximate to one of the second plurality of fuel injectors;
   a single control unit electrically coupled to each of the first plurality of thermocouples and the second plurality of thermocouples; and
   a controller in electronic communication with the single control unit and including non-transitory memory with computer readable instructions for:
      individually adjusting an injection timing of the first and second plurality of fuel injectors in response to electrical signals received from the first and second plurality of thermocouples via the single control unit.

19. The engine fuel system of claim 18, further comprising:
   a first plurality of connections comprised of a metal film, each connection of the first plurality of connections bonded to a surface of the first fuel rail and configured to transfer electrical signals from one of the thermocouples of the first plurality of thermocouples to the single control unit; and
   a second plurality of connections comprised of a metal film, each connection of the second plurality of connections bonded to a surface of the second fuel rail and configured to transfer electrical signals from one of the thermocouples of the second plurality of thermocouples to the single control unit.

* * * * *